US007830045B1

(12) United States Patent
Boulger

(10) Patent No.: US 7,830,045 B1
(45) Date of Patent: Nov. 9, 2010

(54) RAPID DISCONNECT SYSTEM FOR CELLULAR TOWER TRANSMISSIONS

(75) Inventor: Andrew D. Boulger, Sacramento, CA (US)

(73) Assignee: Vinculums Services, Inc., Irvine, CA (US)

( * ) Notice: Subject to any disclaimer, the term of this patent is extended or adjusted under 35 U.S.C. 154(b) by 49 days.

(21) Appl. No.: 12/413,501

(22) Filed: Mar. 27, 2009

(51) Int. Cl.
*H02H 11/00* (2006.01)

(52) U.S. Cl. .................................................... 307/326

(58) Field of Classification Search .................. 307/326
See application file for complete search history.

(56) References Cited

U.S. PATENT DOCUMENTS 5,710,801 A * 1/1998 Dillen et al. ............... 378/98.7
5,710,804 A * 1/1998 Bhame et al. ............ 455/575.1
5,911,117 A * 6/1999 Bhame et al. ............ 455/575.1

* cited by examiner

*Primary Examiner*—Jared Fureman
*Assistant Examiner*—Adi Amrany
(74) *Attorney, Agent, or Firm*—Jerry Turner Sewell

(57) ABSTRACT

A safety disconnect system for a cellular antenna array on a support structure includes an enclosure mountable to a support structure. A fixed connector secured within the enclosure has contacts connected to conductors of at least a first digital data and control cable. A moveable connector within the enclosure includes corresponding contacts connected to conductors of a second digital data and control cable. The two connectors are selectively mated to engage the contacts of the two connectors. When the connectors are mated, transceivers within a base transceiver station (BTS) receive signals from a base station controller (BSC) and transmit RF energy via an array of antennas. A gripping handle secured to the moveable connector has a size and configuration selected to be grasped by a gloved hand to move the moveable connector away from the fixed connector in a rapid and safe manner to disable further transmissions by the transceivers.

5 Claims, 8 Drawing Sheets

RAPID DISCONNECT SYSTEM FOR CELLULAR TOWER TRANSMISSIONS

BACKGROUND OF THE INVENTION

1. Field of the Invention

The present invention is generally in the field of protective disconnect systems to terminate the transmission of RF power to cellular base station antennas mounted on power poles and other shared utility structures.

2. Description of the Related Art

The number of cellular telephones in the United States and in other countries is rapidly increasing. The increase in the number of cellular telephones in use has resulted in an increase in the number of cellular telephone base stations required to provide expanding coverage in previously unserved areas and to provide additional cells in many urban areas when the demand for cellular service exceeds the capacity of existing base stations. In general, a cellular base station comprises a mast, a tower or other support structure (e.g., a building) that supports one or more antennas a sufficient distance above the surface so that the antennas are able to transmit and receive signals over a geographic area, which defines a cell for the cellular network to which the antennas are coupled. A base station also includes one or more sets of transceivers, digital signals processors, control electronics, power sources and the like, which are generally positioned close to the support structure. The antennas on the support structure are coupled to the transceivers via radio frequency (RF) transmission lines. The cellular base stations are spaced apart by distances selected to provide overlap between the coverage areas of adjacent stations to enable ongoing calls to be handed over from one base station to the next when a mobile cellular telephone use moves between two coverage areas.

Although the support structures for many base stations are specifically constructed to support the base station antennas, in many areas, particularly urban areas, a site may not be available to erect a support structure for a base station. For example, an unused plot of land may not be available, the use of the available land may be restricted by ordinance, or the property owners in a desired location may not be willing to sell, lease or otherwise make the land available for a support structure.

In many cases where a suitable support structure cannot be erected or where it is not cost-effective to erect a support structure, cellular antennas are placed on existing support structures, such as utility poles carrying electrical power, telephone lines, or combinations of both. For example, an array of cellular antennas may be positioned on an electrical power pole or telephone pole above or below the existing power lines or telephone lines. The antennas may be attached directly to an unused portion of the pole or may be attached to an extension added to the pole for the purpose of supporting the antennas.

Although the RF energy radiated by the antennas of a cellular base station is not considered to be harmful to a person at ground level, the energy radiated is sufficiently great that a person should not be within a relatively short distance from active cellular antennas. Accordingly, a need exists to cease providing RF transmission signals to the cellular antennas when a utility worker ascends a shared utility pole to perform inspection, repair or maintenance of the lines or other utility equipment on the pole.

SUMMARY OF THE INVENTION

A disconnect system disables the radio frequency power coupled to cellular antennas mounted on a utility pole or other structure that supports non-cellular equipment. The disconnect system provides a simple and quick method for terminating transmissions by transceivers coupled to the cellular antennas to block further emission of RF energy by the cellular base station antennas. The disconnect system is mounted proximate the base of the support structure and is clearly labeled so that a utility worker having no experience or familiarity with the cellular transmission lines is able to disable the RF transmissions by the cellular antennas in one action and be assured that the cellular antennas are not emitting RF energy when the utility worker ascends the support structure to work in the vicinity of the cellular antennas. The antennas of a given cellular service provider on the support structure are disabled by operation of the disconnect system.

The disconnect system receives the digital data and control lines (e.g., the T1 lines) from a base station controller (BSC) before the data and control lines are provided to a base transceiver station (BTS) controlled by the BSC. The disconnect system selectively couples the signals on the data and control lines from the BSC to corresponding data and control lines to the BTS. During normal operation of the BTS, the signals are communicated from the BSC to the BTS without interruption, and transceivers within the BTS transmit RF energy to the antennas on the support structure to provide cellular communication.

The digital data and control lines from the BSC are provided to a first mating connector within the disconnect system, and the digital data and control lines to the BTS are provided to a second mating connector within the disconnect system. When the first mating connector and the second mating connector are engaged, contacts in the first mating connector are engaged with corresponding contacts in the second mating connector to provide uninterrupted communications paths from the BSC to the BTS.

One of the first mating connector and the second mating connector is a fixed connector, which is securely mounted within a weather-resistant enclosure. The other of the two connectors is a moveable connector, which is moveably located within the enclosure proximate to the fixed connector so that the moveable connector is mateable with the fixed connector.

The moveable connector includes an enlarged gripping handle mounted to the connector. The gripping handle is sized and positioned with respect to the moveable connector such that the gripping handle is readily graspable by a gloved hand and is moveable away from the fixed connector in one motion to unmate the moveable connector from the fixed connector and thereby disengage the first transceiver transmission line from the first antenna transmission line and disengage the second transceiver transmission line from the second antenna transmission line. The gripping handle is clearly labeled with "PULL." The enclosure advantageously is further labeled with instructions to pull the handle to disconnect the RF power to the cellular antennas.

When a utility worker wants to perform any activity on the support structure in the vicinity of the cellular antennas, the utility worker only has to open the weather-tight enclosure and pull the gripping handle to disconnect the RF power. The utility worker does not have to have any knowledge of the operation of the cellular base station in order to accomplish this safety procedure.

BRIEF DESCRIPTION OF THE DRAWINGS

The foregoing aspects and other aspects of this disclosure are described in detail below in connection with the accompanying drawing figures in which.

DETAILED DESCRIPTION OF A PREFERRED EMBODIMENT

Figure 1:
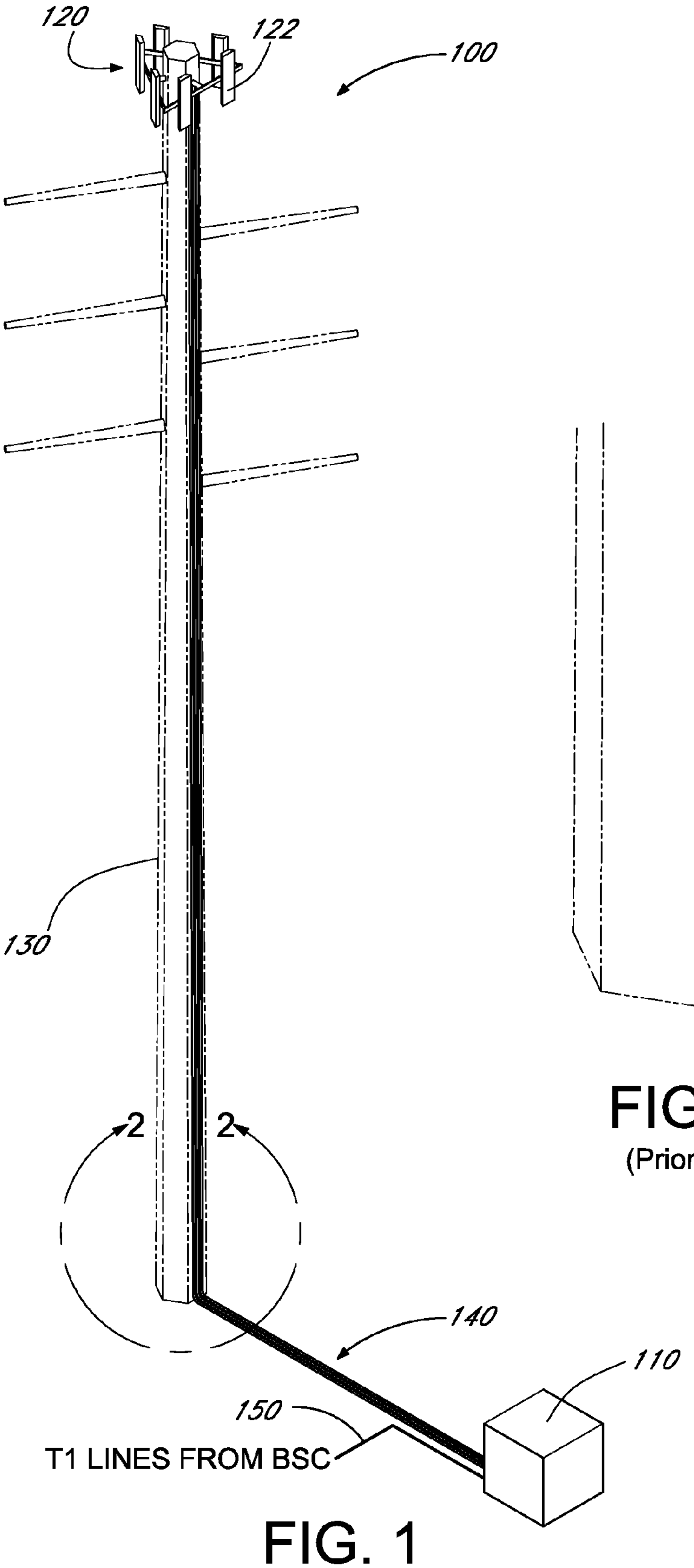
FIG. 1 (Prior Art)
FIG. 1 illustrates a perspective view of an exemplary cellular base station having a structure for housing the base station electronics and having an array of cellular antennas mounted to a top portion of a utility pole.

FIG. 1 illustrates a perspective view of an exemplary conventional cellular telephone base transceiver station (BTS) 100. The BTS comprises a weather-tight equipment housing 110, which encloses the base station electronics (not shown). The BTS further comprises an array 120 of cellular antennas 122, which are mounted to a top portion of a conventional utility pole (pylori) 130, and a coaxial cable assembly 140 that interconnects the cellular antennas to the electronics systems (not shown) within the equipment housing. As illustrated in the enlarged perspective view of FIG. 2, the cable assembly comprises a first radio frequency (RF) transmission cable 142, a second RF transmission cable 144 and a third RF transmission cable 144. More or fewer transmission cables may be included in a BTS in accordance with the number of antennas in the antenna array and in accordance with the number of antenna arrays on the utility pole.

As is well known in the field of cellular communications, the electronics systems within the equipment housing 110 of the BTS 100 include devices that provide an interface with a ground-based telephone service (not shown). In an exemplary embodiment, the equipment within the BTS communicates with a base station controller (BSC) (not shown), which provides an interface between the cellular service provider and other communication services (e.g., local and long distance telephone services). The BTS communicates with the BSC via a plurality of T1 lines represented by a cable 150 in FIG. 1. Although shown as a single line in FIG. 1, it is understood that the T1 lines advantageously comprise multiple twisted pair signal lines in a single jacketed cable. For example, in an exemplary embodiment, the cable advantageously comprises 32 twisted pair signal lines. As is well known in the communications art, a T1 line is a high speed digital line that carries multiplexed digitized voice signals, data signals and control signals between the BTS and the BSC. In a typical cellular system, a single BSC communicates with a large number of base transceiver stations via respect T1 lines to selectively control each BTS in accordance with the locations and activities of the cellular telephones in the area serviced by BSC.

The electronics systems within the enclosure 110 included transceivers (not shown) and control equipment (not shown) that are responsive to the control signals on the T1 lines 150 to transmit the voice and data signals received on the T1 lines via the antenna array 120. The transceivers and control equipment communicate voice and data signals received via the antenna array back to the BSC via the T1 lines. The transceivers within the equipment housing operate in response to demands for cellular telephone service. In the absence of active control signals on a respective T1 line, a transceiver coupled to the T1 line remains inactive and does not transmit RF signals.

Figure 3:
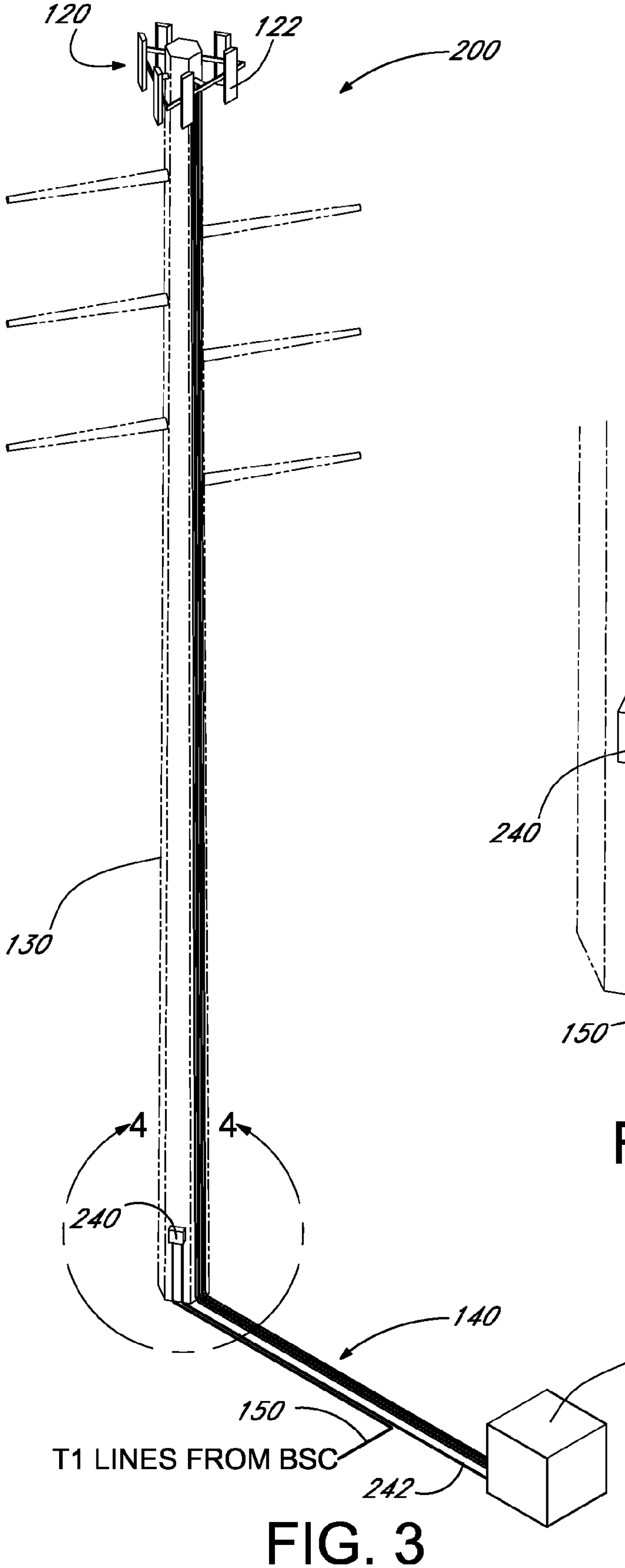
FIG. 3 illustrates a perspective view of the cellular base station of FIG. 1, which further includes a safety disconnect enclosure mounted on a lower portion of the power pole.

FIG. 3 illustrates a perspective view of a cellular telephone base transceiver station (BTS) 200 that incorporates a safety device in accordance with an embodiment of the present invention. The BTS of FIG. 3 includes the equipment housing 110 and the array 120 of cellular antennas 122 mounted on the utility pole 130 as described above in connection with FIG. 1. As shown in the enlarged perspective view of FIG. 4, the RF cable assembly 140 includes the three RF transmission cables 142, 144, 146. As discussed above, the three cables may represent additional transmission cables.

Figure 4:
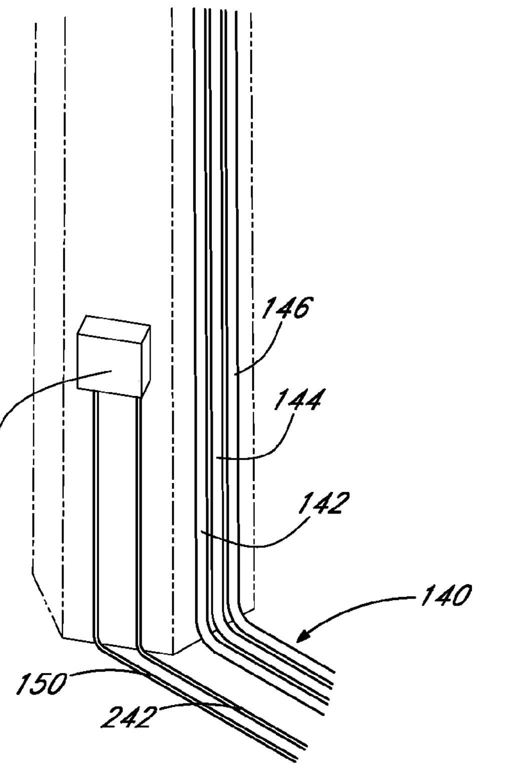
FIG. 4 illustrates an enlarged perspective view of the lowermost portion of the utility pole of FIG. 2 in the area bounded by the line 4-4 in FIG. 3.

The equipment housing 110 in FIG. 3 protects electronics systems (not shown). The electronics systems include conventional RF electronics and controllers as discussed above. The BTS of FIG. 3 is coupled to a BSC (not shown) as described above; however, the T1 lines in the T1 cable 150 from the BSC are not connected directly to the equipment housing. Rather, as shown in FIGS. 3 and 4, the T1 cable from the BSC is coupled to a safety disconnect system 240, which is mounted on or near the utility pole 130. A second T1 cable 242 comprising a corresponding plurality of T1 lines is coupled from the safety disconnect system to the equipment housing. Preferably, the safety disconnect system is positioned on the utility pole at a location proximate to the bottom of the utility pole with respect to the surface from which the utility pole extends so that the safety disconnect system is easily accessible by a utility worker. For example, the safety disconnect system is advantageously positioned approximately 5 feet above the surface on which a utility worker will be standing.

As discussed in more detail below, the safety disconnect system 240 provides a simple and fast way of assuring that the transceivers with the equipment housing 110 are not operational when a utility worker wants to work on the electrical utilities or other equipment on the utility pole 130. In particular, the safety disconnect system completely severs the T1 connections to each of the transceivers within the equipment housing so that the transceivers and the control equipment no longer receive control signals and data signals from the BSC. In the absence of active data and control signals, the transceivers do not transmit and therefore do not provide any RF energy to the antenna array 120 via the RF transmission cables 140. Accordingly, once the utility worker actives the safety disconnect system as described below, the utility worker may safely ascend the utility pole to perform any maintenance and repair functions without having to worry about any RF energy being emitted from the antennas 122 in the antenna array.

Figure 5:
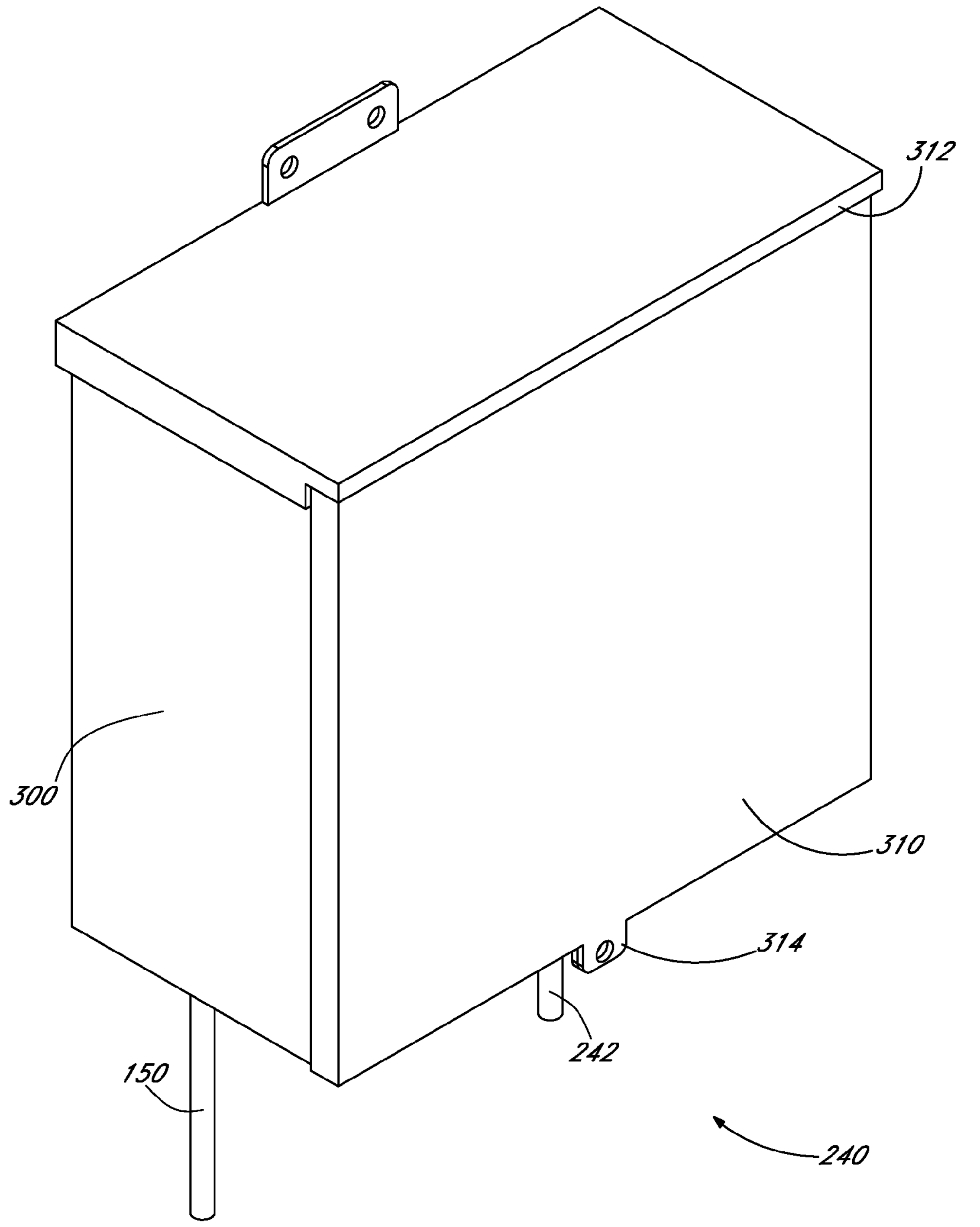
FIG. 5 illustrates a perspective view of the safety disconnect enclosure of FIG. 2 prior to opening the enclosure.

The safety disconnect system 240 is illustrated in FIGS. 5-12. As shown in FIG. 5, the safety disconnect system includes a weather-resistant enclosure 300, which is shown a simplified form in the drawings. For example, in a preferred embodiment, the enclosure advantageously comprises a Hoffman 12×12×6, Type 3R, enclosure commercially available from Hoffman, Anoka, Minn., as Model No. A12R126HCR. Other suitable enclosures from Hoffman and from other suppliers may also be used to house the safety disconnect system in accordance with the following description. The illustrated enclosure includes a removable front cover 310 that has a top that slips beneath a drip shield 312. The bottom of the front cover is advantageously secured by a hasp 314 or other suitable securing mechanism that may be locked with a padlock (not shown) or with a tamper-evident security seal (not shown). In commercially available enclosure, the front cover may also be secured to the enclosure by screws (not shown) or latches (not shown). When closed the removable front cover protects the inside of the enclosure and any components therein against rain and other weather conditions.

The first T1 cable 150 from the BSC enters the enclosure 300 via a suitable fitting, such as, for example, a first liquid-tight, strain relief fitting 320 (shown in FIG. 7) through a bottom wall of the enclosure. The second T1 cable 242 to the equipment housing 110 (FIG. 3) exits the enclosure via a second liquid-tight, strain relief fitting 322 (shown in FIG. 7) through the bottom wall of the enclosure. The first and second T1 cables may be protected by conduits (not shown) having suitable fittings for connection to the enclosure.

Although the first T1 cable 150 is illustrated as running from the BSC to the enclosure 300, it should be understood that the first T1 cable from the BSC can enter the equipment housing 110 and then connect to the enclosure on the utility pole 130. This is advantageous for retrofitting existing installations where the T1 cable from the BSC to the equipment housing is already in place. In such an installation, the first T1 cable and the second T1 cable 242 may be routed between the equipment housing and the enclosure in a single conduit (not shown).

Figure 2:
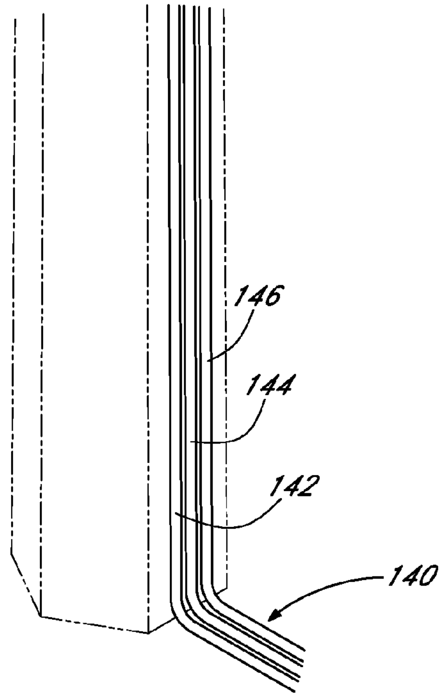
FIG. 2 (Prior Art)
FIG. 2 illustrates an enlarged perspective view of the lowermost portion of the utility pole of FIG. 1 in the area bounded by the line 2-2 in FIG. 1.
Figure 6:
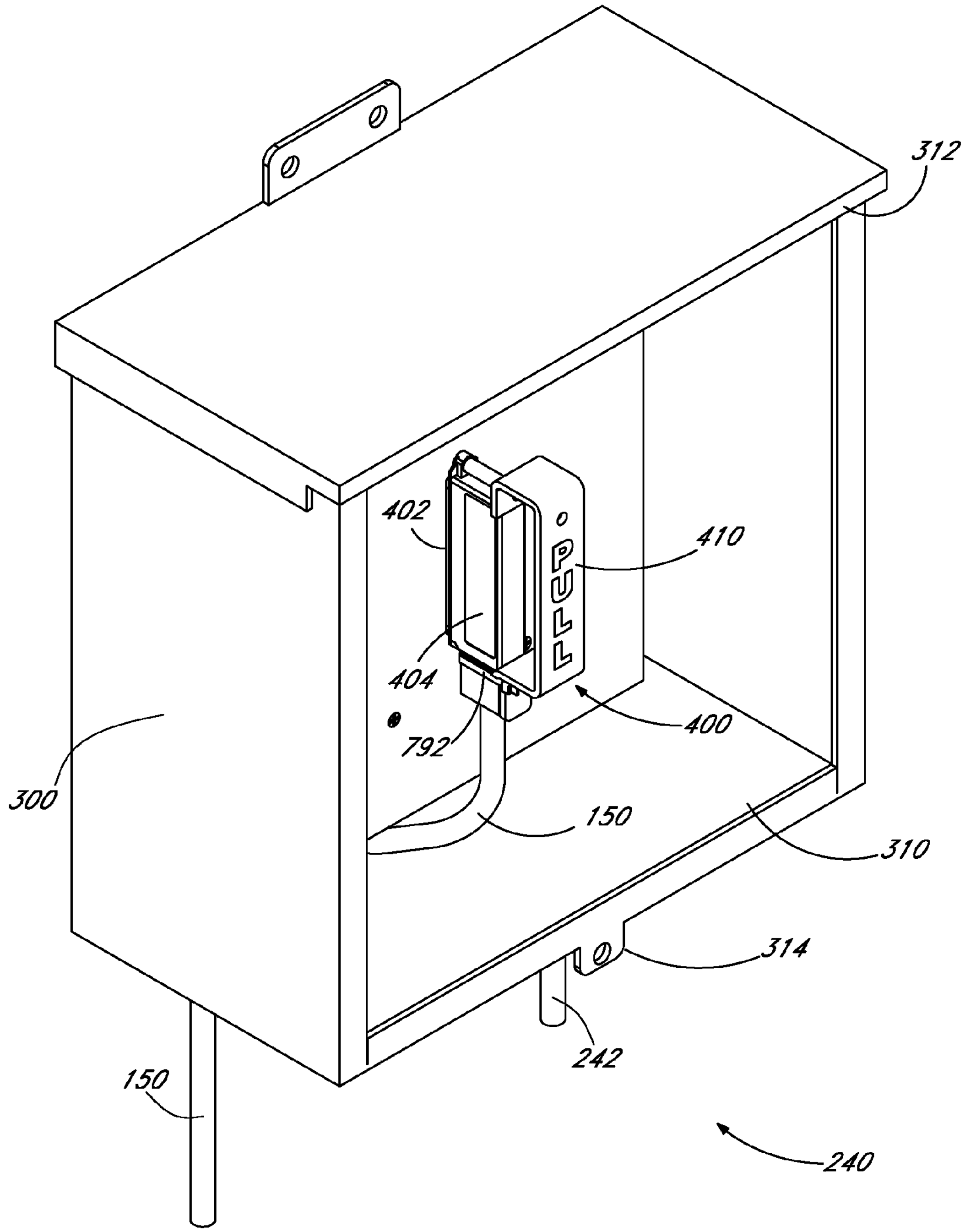
FIG. 6 illustrates a perspective view of the safety disconnect enclosure of FIG. 2 after opening the enclosure and prior to activating the safety disconnect mechanism.
Figure 7:
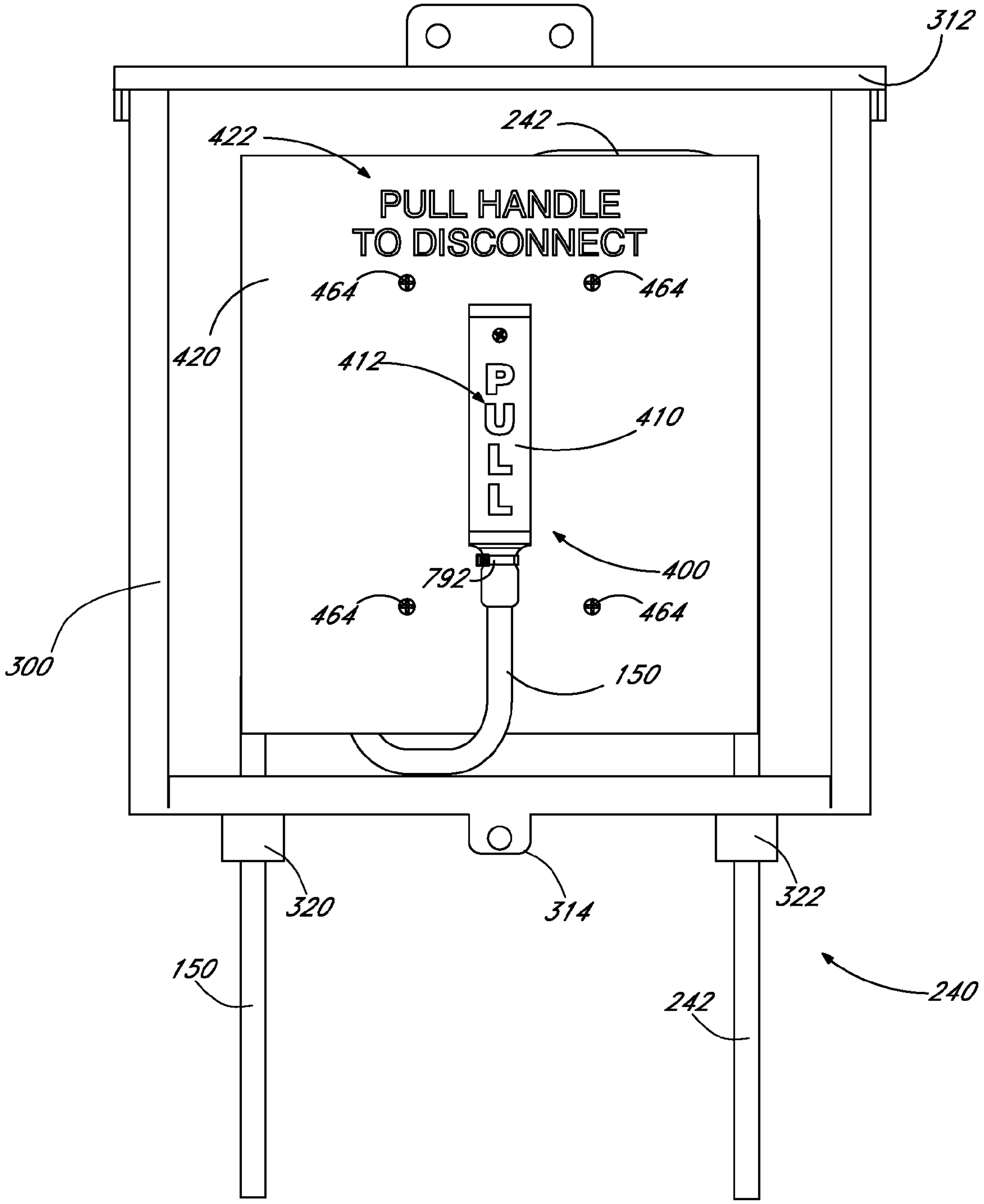
FIG. 7 illustrates a front view of the open safety disconnect enclosure of FIG. 6 prior to activating the safety disconnect mechanism.
Figure 8:
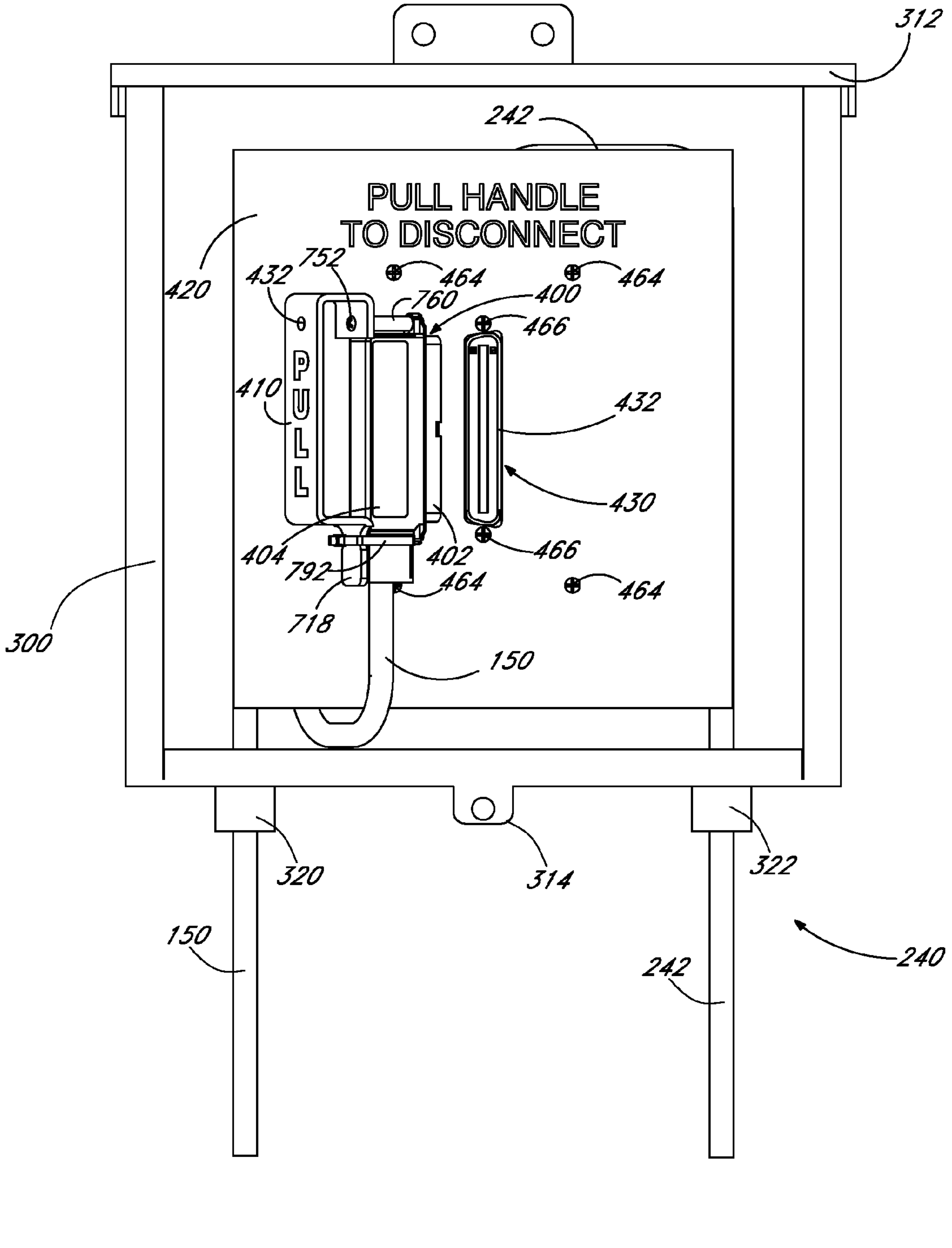
FIG. 8 illustrates a front view of the open safety disconnect enclosure of FIG. 6 after activating the safety disconnect mechanism.
Figure 9:
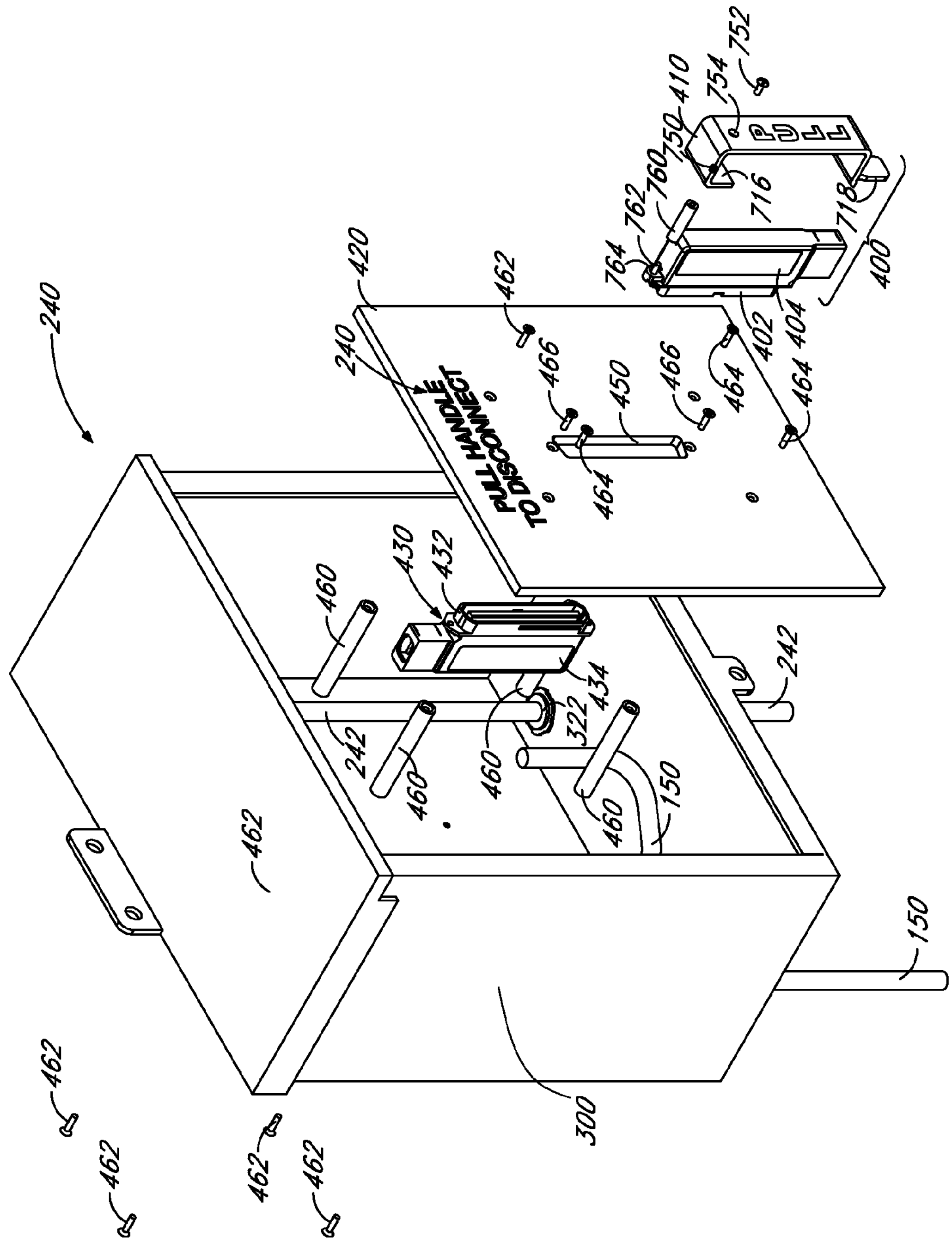
FIG. 9 illustrates an exploded perspective view of the safety disconnect enclosure of FIG. 2.

FIG. 6 illustrates a perspective view of the safety disconnect system 240 of FIG. 2 after removing the cover 310 to open the enclosure 300 and prior to activating the safety disconnect mechanism described below. FIG. 7 illustrates a front elevational view of the open enclosure. FIG. 8 illustrates a front elevational view of the safety disconnect system after activating the safety disconnect mechanism. FIG. 9 illustrates an exploded perspective view of the safety disconnect system with the cover removed.

As shown in FIGS. 6-9, the first T1 cable 150 from the BSC is terminated in a first connector assembly 400. The first connector assembly includes a first connector 402 and a first strain relief cover 404. The first connector assembly further includes a safety gripping handle 410, which is labeled with indicia (e.g., text) 412 to indicate the operation of the handle. In the illustrated embodiment, the indicia provides a one-word instruction "PULL" to indicate that the handle should be pulled outward to operate.

The first connector 402 comprises, for example, a Model 553215 CHAMP connector configured as a receptacle with 64 contacts. The CHAMP connector is an AMP connector, which is commercially available from Tyco Electronics of Harrisburg, Pa. Similar connectors from other suppliers may also be used. Each conductor within the first T1 cable is electrically connected to at least one respective contact within the first connector. The conductors are connected to the connector in accordance with the instructions provided by the manufacturer of the cable. In the illustrated embodiment, the first T1 cable is advantageously comprises 32 sets of twisted pair conductors for a total of 64 conductors. The conductors of the first T1 cable are housed within an outer weather-resistant jacket. The T1 cable may also include a shield between the conductor bundle and the outer jacket. Cables are commercially available from many suppliers. For example, in one embodiment, the 32-pair cable is provided by ADC Krone of Eden Prairie, Minn.

After connecting the ends of the conductors of the first T1 cable 150 to the respective contacts of the first connector 402, the back of the first connector is covered with the first strain relief cover 404 to protect the ends of the conductors. The first strain relief cover also snugly secures the outer jacket of the first T1 cable 150 so that force applied to the cable is less likely to pull the cable out of the cover and disconnect any of the conductors from the first connector. Preferably, the first strain relief cover has a 90-degree exit for the first T1 cable. In the illustrated embodiment, the first strain relief cover comprises a Model No. 1-552296-1 strain relief cover from Tyco Electronics. The first strain relief cover may also comprise a corresponding strain relief cover from other suppliers. In the illustrated embodiment, the strain relief cover has a width of approximately 15.5 millimeters (approximately 0.6 inch).

In the illustrated embodiment, the first connector assembly 400 is positioned in the enclosure 300 with the engagement portion of the connector 402 (e.g., the surface of the connector with the exposed contacts (not shown)) directed toward a panel 420 mounted in a position parallel to a rear wall of the enclosure. In the illustrated embodiment, the panel comprises white or clear acrylic having a thickness of approximately 0.25 inch. The panel is parallel to and offset from the rear wall of the enclosure by approximately 2.5 inches.

The panel 420 is labeled with additional indicia 422 to provide more detailed instructions to a utility worker. In the illustrated embodiment, the additional indicia comprise the four words "PULL HANDLE TO DISCONNECT," which are positioned above the safety gripping handle 410. Preferably, the indicia comprise a bright color (e.g., red) to provide distinct contrast with the panel. As further discussed below, the indicia are preferably reflective.

As shown in FIGS. 8 and 9, the panel 420 supports a second connector assembly 430, which is connected to the second T1 cable 242. The second connector assembly includes a second connector 432 and a second strain relief cover 434. The second connector advantageously comprises, for example, a Model 552276-1 CHAMP 64-contact socket, which is an AMP connector that is commercially available from Tyco Electronics. The second T1 cable also comprises 32 twisted pairs of conductors (64 conductors) and preferably has characteristics that match the characteristics of the first T1 cable 150. Each conductor within the second T1 cable is electrically connected to at least one respective contact within the second connector. Preferably, the second strain relief cover corresponds to the first strain relief cover 404 described above (e.g., the Model No. 1-552296-1 strain relief cover from Tyco Electronics).

The engagement portion of the second connector 432 is directed through an opening 450 (FIGS. 8 and 9) in the panel 420 and thus faces toward the front of the enclosure 300 to receive the engagement portion of the first connector 402 to provide a secure mechanical and electrical interconnection between the two connectors and between the corresponding contacts within the two connectors. Although not shown, the connectors may include a conventional latching mechanism to further hold the connectors together; however, the latching mechanism is not required. The connections between the conductors in the second cable assembly and the contacts of the second connector are selected so that corresponding conductors in the two cable assemblies are connected to corresponding contacts. Accordingly, when the first connector and the second connector are mated, the conductors in the two cable assemblies provide continuous electrical propagation paths between the BSC and the equipment enclosure 110 (FIG. 3).

As shown in the exploded view of FIG. 9, the panel 420 is secured to and spaced apart from the rear wall of the enclosure 300 via a plurality of spacers (e.g., 4 spacers) 460. The spacers are secured to the rear wall of the enclosure by a corresponding plurality of screws 462 and are secured to the panel by a corresponding plurality of screws 464. In the illustrated embodiment, each spacer has a length of approximately 2.5 inches so that a volume is formed between the panel and the rear wall of the enclosure to accommodate the second connector assembly 430 and the second T1 cable 242. The second connector 432 is secured to the back panel by two mounting screws 466. Preferably, the screws that secure the spacers and the second connector are flat head screws.

As discussed above, the panel 420 is clearly labeled with instruction indicia 422 positioned above the first connector assembly 400. The plainly worded indicia (PULL HANDLE TO DISCONNECT) provide a utility worker with all the information needed to safely disable the transmission of RF energy from the equipment enclosure 110 (FIG. 3) to the antenna array 120 at the top of the utility pole 130. Preferably, the instruction indicia are formed with self-adhesive vinyl letters in a color (e.g., red) that contrasts with the color of the back panel. Also preferably, the vinyl letters are advantageously formed of a reflective vinyl material described below.

As discussed above, the first connector assembly 400 includes the safety gripping handle 410, which is mechanically connected to the first connector 402 and the first strain relief cover 404. The handle has a size and shape selected so that the handle can be easily grasped by a utility worker wearing gloves. As shown in a side elevational view of the handle in FIG. 10 and a front elevational view of the handle in FIG. 11, the handle is formed from a generally rectangular material, such as, for example, ⅛ inch acrylic. Preferably, the acrylic comprises a "safety"-related color, such as bright red. The exposed side of the material is clearly marked with indicia to instruct a utility worker to PULL the handle. In the illustrated embodiment, the indicia comprise block lettering formed on a self-adhesive material, such as, for example, black reflective vinyl film. Such material is available as Calon® Reflecta-Cal Reflective Vinyl Film from Arlon, 2811 S. Harbor Boulevard, Santa Ana, Calif. 92704.

Figure 10:
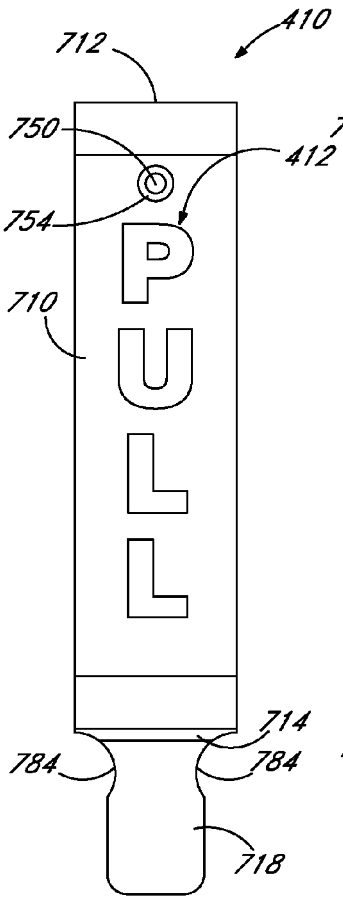
FIG. 10 illustrates a front elevational view of the safety gripping handle of FIGS. 6-9.
Figure 11:
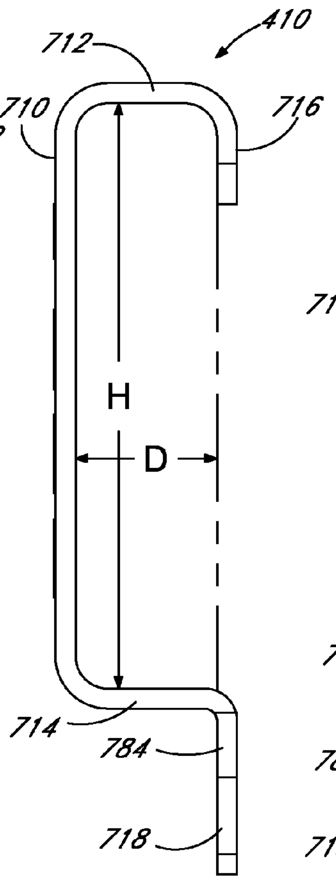
FIG. 11 illustrates a right side elevational view of the safety gripping handle of FIGS. 6-9.
Figure 12:
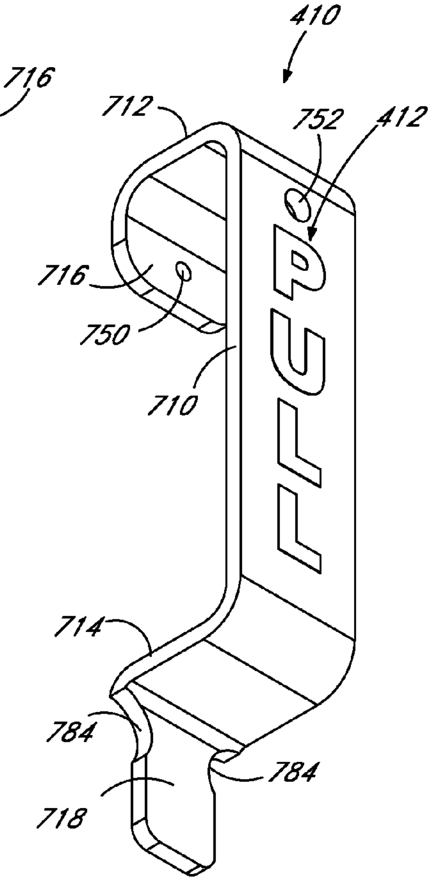
FIG. 12 illustrates a perspective view of the safety gripping handle of FIGS. 6-9 looking from the lower left of the handle.

The acrylic material of the safety gripping handle 410 is formed to create a profile shown in side elevational view of FIG. 10. The handle comprises a main handle portion 710, an upper leg 712, a lower leg 714, an upper mounting flange 716 and a lower tab 718. As shown in the front elevational view of FIG. 9, the handle has width of approximately 1 inch except for the lower tab. The upper leg and the lower leg are generally perpendicular to the main handle portion. The upper mounting flange is generally perpendicular to the upper leg and extends downwardly approximately 0.75 inch from the upper surface of the upper leg such that the upper mounting flange is generally parallel to the main handle portion. The lower tab extends downwardly approximately 1 inch from the lower surface of the lower leg and is generally perpendicular to the lower leg. As illustrated, the main handle portion, the upper leg and the upper mounting flange have a profile that generally forms an inverted "J" shape. The lower leg portion and the main handle portion have a profile that generally forms an "L" shape.

The dimensions of the profile of the safety gripping handle 410 are selected in the illustrated embodiment so that a vertical height ("H" in FIG. 11) between the lower surface of the upper leg 712 and the upper surface of the lower leg 714 is approximately 3.625 inches. The facing surfaces of the upper mounting flange 716 and the main handle portion 710 are spaced apart by a horizontal distance ("D" in FIG. 11) of approximately 0.875 inch. Accordingly, when the handle is mounted to the first connector 402 and the first strain relief cover 404, a generally rectangular opening is formed between the first strain relief cover and the main handle portion that has a length of approximately 0.875 inch and width of approximately 1 inch. The width is approximately ⅛ inch less in the portion of the handle that includes the upper mounting flange. The horizontal distance between the facing surfaces is sufficient to allow the gloved fingers of a person to be inserted between the first strain relief cover and the inner surface of the main handle portion in order to exert a force outwardly against the main handle portion. Preferably, the perpendicular transitions between the portions of the handle profile are relieved with fillets having outer radii of approximately 0.2 inch.

The upper mounting flange 716 of the safety gripping handle 410 has a mounting hole 750 (FIGS. 10 and 12) formed therein to receive a handle mounting screw 752. Preferably, the hole has a diameter of approximately ⅛ inch. A clearance hole 754 is formed in an upper portion of the main handle portion 710 in horizontal alignment with the mounting hole. The clearance hole preferably has a diameter of approximately 0.25 inch to allow a screwdriver to extend through the clearance hole and engage the head of the handle mounting screw in the mounting hole. Preferably, the handle mounting screw is a round head screw configured to engage a Phillips head screwdriver.

As further shown in FIG. 9 the mounting screw 752 engages a threaded bore in a first end of a handle spacer 760. The handle spacer has a length selected to generally correspond to the height of the first strain relief cover 404 with respect to the back of the first connector 402. For example, in the illustrated embodiment, the handle spacer has a length of approximately 1 inch. A connector mounting screw 762 passes through a conventional mounting hole 764 in the first connector and engages the threaded bore of the handle spacer at a second end. When the handle mounting screw and the connector mounting screw are both fully tightened the upper end of the safety gripping handle 410 secured to the first connector.

As shown in the front elevational view of FIG. 10, the lower tab 718 of the safety gripping handle 410 has a width corresponding to the width of the main handle portion 710 at the transition from the lower leg 714. Immediately below the transition, the width of the lower tab is reduced by two arcuate cuts 780, 782 that are mirrored with respect to the vertical center of the lower tab. Each cut has a radius of approximately 0.25 inch and the center of each cut is displaced inwardly by approximately 0.05 inch so that the tab has a minimum width of approximately 0.4 inch at a waist portion 784 approximately 0.25 inch below the lower leg. The upper portion of each cut extends horizontally outward at a tangent with respect to the uppermost perimeter of the respective cut. A lowermost portion 784 of the lower tab has a width of approximately 0.5 inch so that the lowermost portion is wider than the waist portion.

As shown in FIGS. 6-8, the lower tab 718 is secured to an extended portion 790 of the first strain relief cover 402 by at least one cable tie 792. The width of the waist portion 784 of the lower tab is selected to be approximately the same as the width of the extended portion of the second strain relief cover so that when the tie wrap is fully tightened, the tie wrap is precluded from slipping off the lower tab by the wider lowermost portion 784 of the lower tab. Accordingly, the safety gripping handle 410 is secured to the first connector 402 by the mounting screws and is secured to the first strain relief cover by the tie wrap so that when the handle is pulled, the first connector is disengaged (unmated) from the second connector 432.

When a utility worker arrives at the power pole 130 to perform repair or maintenance work, the utility worker only has to remove the cover 310 from the enclosure 300. Then, the utility worker is faced with only one unambiguous instruction to "pull" the safety gripping handle 410. After performing this single action, the first connector 402 is disengaged from the second connector 432 and all data and control signals to the transceivers within the equipment housing 110 are immediately terminated. In the absence of data inputs and control inputs via the second T1 cable 242, all of the transceivers immediately cease operation and no longer generate any RF energy to the antennas 122 in the antenna array 120. The utility worker can then safely ascend to the vicinity of the antenna array without having to be concerned about the effects, if any, of being close to a source of RF energy.

When the first connector 402 is not engaged with the second connector 432 on the panel 420, the first connector assembly 400 is movable within the enclosure and is restrained only by the length and flexibility of the first T1 cable 150. Accordingly, when a utility worker pulls the safety gripping handle 410 to disengage the connectors, the first connector assembly will move away from the second connector so that the two connectors must be purposely reengaged.

The safety gripping handle 410 on the first connector assembly 400 provides advantages over a conventional connector and strain relief cover without the gripping handle. In particular, a utility worker often wears gloves to protect from cold weather and also to protect from injuries caused by contact with rough surfaces, which may also be electrically active. Furthermore, often emergency electrical repairs have to be accomplished at night, in inclement weather, or in a combination of adverse factors. The utility worker is trained to handle issues with electrical power transmission and is not likely to be familiar with the cellular telephone transmission equipment that has been added to the utility pole. The utility worker is likely to be concerned with potential harm from exposure to RF emissions in the vicinity of the work area. The large gripping handle with the highly visible markings and simple instructions provides the utility worker with a quick and easy method to terminate the RF transmissions so that the utility worker can concentrate on the repair or maintenance work to be accomplished. The large gripping handle also presents the utility worker with a device that appears to be structurally sturdy and electrically safe so that the utility worker will not hesitate to follow the instructions. A utility worker presented with a conventional connector assembly without the gripping handle disclosed herein would have to disengage the connectors by gripping the sides of the relatively narrow (e.g., 15.5 millimeters) strain relief cover and pulling outward. The utility worker must rely on the friction between the utility worker's gloves and the sides of the strain relief cover to provide sufficient force to remove the connector. In contrast, the gripping handle presents a large surface area to be grasped by the utility worker. More particularly, the utility worker is able to position at least the tips of the worker's gloved fingers between the gripping handle and the first strain relief cover 404 to easily grasp the connector assembly and apply sufficient outward force against the inner surface of the gripping handle to disengage the connectors without having to rely only on friction.

While the utility worker is working on the utility pole and the BTS is inactive, the BSC connected to the BTS will recognize that the BTS is not operating by the absence of data and status signals from the BTS. Because the BSC is communicating with other BTS's in the service area, the BSC is likely to be able to route communications previously handled by the disabled BTS through one or more of the other BTS's.

After the utility worker has completed the repair or maintenance work on the utility pole, the preferred protocol is to contact the cellular telephone provide responsible for the base station so that a properly trained technician can follow the proper procedures for reactivating the antenna array 120. For example, the technician will verify that the contacts in the first connector 402 and the second connector 432 have not been damaged. The technician may also turn off the transceivers before remating the two connectors so that the transceivers may be reactivated in accordance with any established protocol the cellular service company or the FCC may require. Thereafter, the technician closes the cover 310 on the enclosure 300.

One skilled in art will appreciate that the foregoing embodiments are illustrative of the present invention. The present invention can be advantageously incorporated into alternative embodiments while remaining within the spirit and scope of the present invention, as defined by the appended claims.

What is claimed is:

1. A safety disconnect system for a cellular antenna array on a support structure comprising:

an enclosure mountable to a support structure having at least one antenna mounted thereon;

a fixed connector secured within the enclosure, the fixed connector comprising a plurality of contacts electrically connected to a first cable for data and control signals between a base system controller and a base transceiver station;

a moveable connector positioned within the enclosure proximate to the fixed connector, the moveable connector comprising a corresponding plurality of contacts electrically connected to a second cable for data and control signals between the base station controller and the base transceiver station, the moveable connector selectively mateable with the fixed connector to engage the plurality of contacts of the moveable connector with the plurality of contacts of the fixed connector to connect the first cable and the second cable in series between the base system controller and the base transceiver station to enable the base system controller to communicate with the base transceiver station to cause the base transceiver station to selectively generate RF energy to the antenna on the support structure; and a gripping handle secured to the moveable connector, the gripping handle having a size and configuration selected to be grasped by a gloved hand to move the moveable connector away from the fixed connector to disconnect the first cable from the second cable to interrupt communication between the base station controller and the base transceiver station and thereby prevent the base transceiver station from transmitting RF energy via the antenna.

2. The safety disconnect system as defined in claim 1, wherein the fixed connector and the moveable connector are connectors having multiple pins, each of the first cable and the second cable comprises multiple pairs of conductors within a common outer covering, the conductors in each pair of conductors twisted together, the respective ends of the conductors in each cable connected to the pins of the respective connectors.

3. The safety disconnect system as defined in claim 1, wherein the gripping handle provides a larger surface area for grasping than a surface area provided by the moveable connector.

4. The safety disconnect system as defined in claim 1, wherein the gripping handle is displaced from the connector by a sufficient distance to allow at least the tips of a person's fingers to be inserted between the connector and an inner surface of the gripping handle.

5. A method of safely disabling the radiation of radio frequency energy from cellular base station antennas mounted on a support structure shared with other utilities, comprising:

routing data and control signals from a cellular base station controller to a disconnect system mounted proximate to the support structure via a first cable;

routing the data and control signals from the disconnect system to a cellular base transceiver station via a second cable, the cellular base transceiver station responsive to the data and control signals to radiate radio frequency energy from the cellular base station antennas;

providing a fixed mating connector and a moveable mating connector within the disconnect system that are engageable to electrically connect the first cable and the second cable; and providing a gripping handle attached to the moveable mating connector to provide additional surface area to grasp in order to pull the moveable mating connecter out of engagement with the fixed mating connector to electrically disconnect the first cable and the second cable to block the data and control signals to the cellular base transceiver station to thereby terminate the radiation of radio frequency energy.

* * * * *